United States Patent
Ma et al.

(10) Patent No.: US 12,325,316 B2
(45) Date of Patent: Jun. 10, 2025

(54) STATIONARY DEVICE, INSTALLING METHOD THEREOF, AND AUTONOMOUS WORKING SYSTEM

(71) Applicant: SHANGHAI SUNSEEKER ROBOTIC TECHNOLOGY CO., LTD., Shanghai (CN)

(72) Inventors: Miaowu Ma, Shanghai (CN); Jian Xiong, Shanghai (CN)

(73) Assignee: SHANGHAI SUNSEEKER ROBOTIC TECHNOLOGY CO., LTD., Shanghai (CN)

( * ) Notice: Subject to any disclaimer, the term of this patent is extended or adjusted under 35 U.S.C. 154(b) by 333 days.

(21) Appl. No.: 17/617,161

(22) PCT Filed: Nov. 22, 2020

(86) PCT No.: PCT/CN2020/130711
§ 371 (c)(1),
(2) Date: Dec. 7, 2021

(87) PCT Pub. No.: WO2021/098868
PCT Pub. Date: May 27, 2021

(65) Prior Publication Data
US 2022/0272902 A1    Sep. 1, 2022

(30) Foreign Application Priority Data
Nov. 22, 2019   (CN) .......................... 201911158505.X
Nov. 29, 2019   (CN) .......................... 201911207649.X
(Continued)

(51) Int. Cl.
*B60L 53/30*   (2019.01)
*A01D 34/00*   (2006.01)
*B60L 53/16*   (2019.01)

(52) U.S. Cl.
CPC ............ *B60L 53/30* (2019.02); *A01D 34/008* (2013.01); *B60L 53/16* (2019.02)

(58) Field of Classification Search
CPC .......... B60L 53/30; B60L 53/16; B60L 53/36; B60L 53/14; A01D 34/008; B60K 7/0007;
(Continued)

(56) References Cited

U.S. PATENT DOCUMENTS 10,588,255 B2 *   3/2020   Song ........................ H02J 3/322
2007/0142964 A1 *   6/2007   Abramson ........... A01D 34/008
700/245

(Continued)

FOREIGN PATENT DOCUMENTS

CN   208015394 U   10/2018
CN   208708140 U   4/2019
(Continued)

OTHER PUBLICATIONS

International Search Report dated Feb. 22, 2021, for International Patent Application No. PCT/CN2020/130711.
Extended European Search Report dated Dec. 4, 2023, for European Patent Application No. 20889533.4.

*Primary Examiner* — Stacy Whitmore
(74) *Attorney, Agent, or Firm* — KARCESKI IP LAW, PLLC

(57) ABSTRACT

A stationary device includes a first base, a second base and a stationary device control assembly. The first base is configured to be detachably connected with the second base. The second base includes an inner cavity in which the stationary device control assembly is housed. The stationary device is configured to include a first state and a second state. For the first state, the first base is fixed on a working surface, and the second base is connected to the first base.

(Continued)

For the second state, the first base is fixed on the working surface, and the second base is separated from the first base.

18 Claims, 7 Drawing Sheets

(30) Foreign Application Priority Data

| Feb. 20, 2020 | (CN) | ......................... 202010104901.0 |
| Feb. 20, 2020 | (CN) | ......................... 202020189775.9 |
| Feb. 20, 2020 | (CN) | ......................... 202020189820.0 |
| Feb. 25, 2020 | (CN) | ......................... 202010114587.4 |
| Feb. 25, 2020 | (CN) | ......................... 202020204570.3 |
| Apr. 29, 2020 | (CN) | ......................... 202010353592.0 |
| Apr. 29, 2020 | (CN) | ......................... 202020686066.1 |

(58) Field of Classification Search
CPC ... B60K 2001/001; B60K 1/00; F16B 5/0664; Y02T 10/70; Y02T 10/7072; Y02T 90/14
See application file for complete search history.

(56) References Cited

U.S. PATENT DOCUMENTS

| 2011/0130875 | A1* | 6/2011 | Abramson | ............ A47L 9/2873 |
| | | | | 700/245 |
| 2018/0064023 | A1 | 3/2018 | Song et al. | |
| 2018/0370376 | A1* | 12/2018 | Liu | ....................... G05D 1/0225 |
| 2021/0083494 | A1* | 3/2021 | Towner | ................... B60L 53/35 |

FOREIGN PATENT DOCUMENTS

| CN | 209084175 U | 7/2019 | |
| CN | 110447398 A | 11/2019 | |
| CN | 111165159 A | 5/2020 | |
| CN | 111183781 A | 5/2020 | |
| CN | 111193131 A | 5/2020 | |
| EP | 2656718 A1 | 10/2013 | |
| WO | WO-2005074362 A2 * | 8/2005 | .......... A01D 34/008 |
| WO | 2021130939 A1 | 7/2021 | |

* cited by examiner

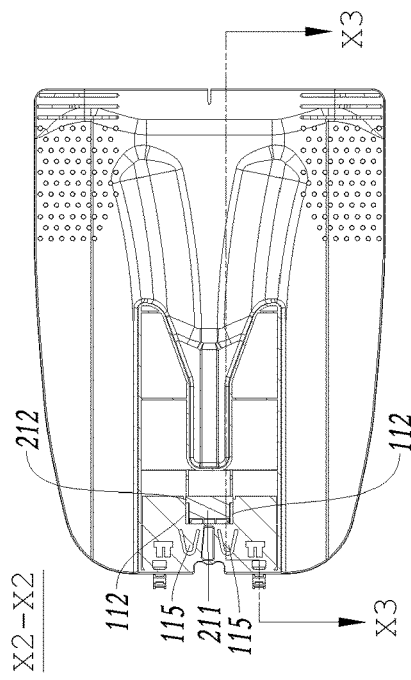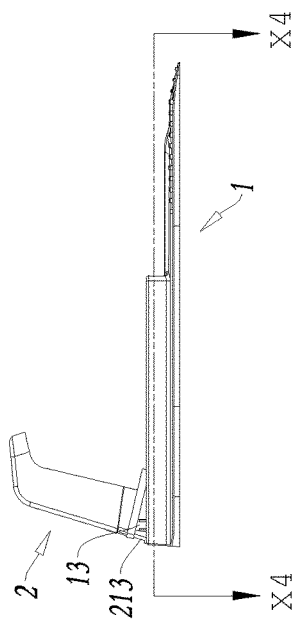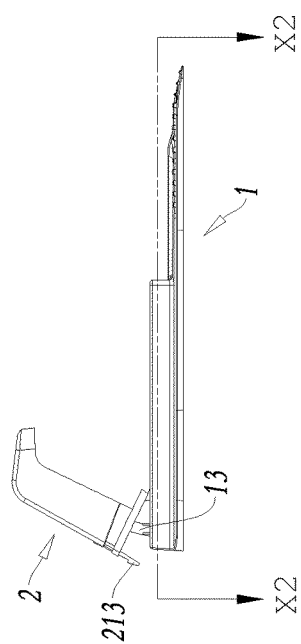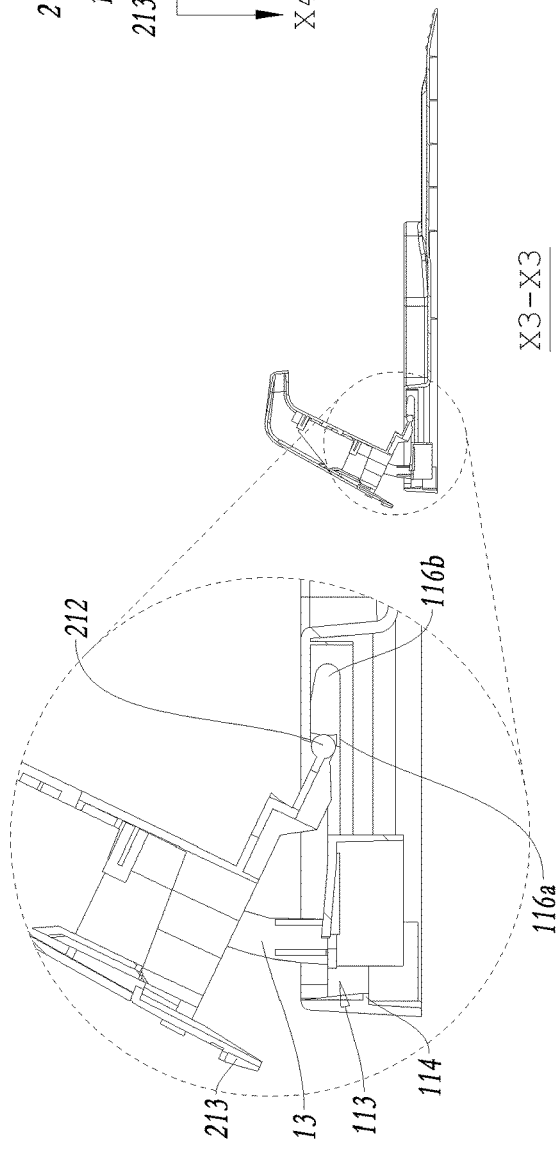

STATIONARY DEVICE, INSTALLING METHOD THEREOF, AND AUTONOMOUS WORKING SYSTEM

CROSS-REFERENCE TO RELATED APPLICATION(S)

This is a National Stage Entry into the United States Patent and Trademark Office from PCT/CN2020/130711, filed on Nov. 22, 2020, which relies on and claims priority to CN 201911158505.X, filed on Nov. 22, 2019; CN 201911207649.X, filed on Nov. 29, 2019; CN 202010104901.0, filed on Feb. 20, 2020; CN 202020189775.9, filed on Feb. 20, 2020; CN 202020189820.0, filed on Feb. 20, 2020; CN 202020204570.3, filed on Feb. 25, 2020; CN 202010114587.4, filed on Feb. 25, 2020; CN 202010353592.0, filed on Apr. 29, 2020; and CN 202020686066.1, filed on Apr. 29, 2020, the entire contents of all of which are incorporated herein by reference.

FIELD OF THE INVENTION

Example embodiments generally relate to the field of artificial intelligence technology, further particularly relate to a stationary device, an installing method thereof, and an autonomous working system.

BACKGROUND OF THE INVENTION

The commercialization of autonomous working systems represented by robotic lawn mowers and robotic vacuum cleaner, etc. is maturing. Such systems typically comprise at least one mobile device and at least one stationary device. The mobile device is typically equipped with an energy storage unit, a control unit, and a driving unit, which is restricted to work autonomously in a certain working area, thereby reducing human labor burden. The mobile device is usually required to automatically return to the stationary device for charging before the energy is exhausted. The ability to accurately and reliably return to the stationary device for charging is one of the technical aspects of this type of autonomous working systems that need to be considered. There are also various forms of charging systems appearing on the market. However, these stationary devices are still inadequate in terms of mechanical structural design and electrical component design, leading to problems such as not conductive to reducing packaging size, inconvenient disassembly and assembly, and complicated maintenance etc. In addition, for the robotic lawn mower system, the stationary device is usually mounted to the lawn by ground nails. Due to periodic seasonal differences in the growth of lawns, especially in the low temperature seasons like autumn and winter, the lawn is usually in a state of growth arrest or withering, so there will be consecutive months of each year when the mobile device does not need to work. Since the mobile device is convenient to carry, users usually take the mobile device back indoors for storage in autumn and winter to avoid shortening its service life caused by the ultimate weather while reducing the risk of being stolen. However, since the stationary device is nailed to the lawn, the installation and disassembly are relatively cumbersome, so it will be exposed to the outdoor environment all the year round. On the one hand, it is necessary to face the challenge of short service life or increasing cost to improve its weather resistance, on the other hand, it also increases the risk of being stolen.

SUMMARY OF THE INVENTION

In order to solve the above technical problems, embodiments of the present invention provide a stationary device.

Some example embodiments may therefore provide a stationary device, comprises a first base, a second base and a stationary device control assembly; characterized in that, the first base is configured to be detachably connected with the second base; the second base includes an inner cavity in which the stationary device control assembly is housed; the stationary device is configured as comprising: a first state, the first base can be fixed on the working surface, and the second base is connected to the first base; a second state, the first base can be fixed on the working surface, and the second base is separated from the first base.

As an embodiment of the present invention, the first base comprises a first base connecting portion, and the second base comprises a second base connecting portion; the first base connecting portion is configured to cooperate with the second base connecting portion to detachably connect the first base and the second base together.

As an embodiment of the present invention, the first base connecting portion is provided with a rotating shaft, and the second base connecting portion is provided with a rotating shaft mating structure fitting with the rotating shaft, or the second base connecting portion is provided with a rotating shaft, and the first base connecting portion is provided with a rotating shaft mating structure fitting with the rotating shaft, and the first base connecting portion and the second base connecting portion are also provided with a buckle structure, after the first base and the second base are connected with the rotating shaft and the rotating shaft mating structure, they are fixed by the buckle structure.

As an embodiment of the present invention, the buckle structure comprises a hook arranged on the first base and a groove arranged on the second base cooperating with the hook, or the buckle structure comprises a hook arranged on the second base and a groove arranged on the first base cooperating with the hook.

As an embodiment of the present invention, the first base connecting portion comprises a first mounting groove, a second mounting groove and a third mounting groove, the second base connecting portion comprises an extension portion, a hook and a rotating shaft, the hook is buckled to the second mounting groove, the extension portion is matched with the first mounting groove and the rotating shaft is rotatably connected to the third mounting groove.

As an embodiment of the present invention, the first mounting groove extends along the upper surface of the first base, and the second mounting groove extends downward from the upper surface of the first base; two baffles are formed in the first mounting groove, and each baffle is provided with the third mounting groove, the interval between the two baffles is smaller than the width of the first mounting groove; the third mounting groove has a guiding portion located at the front and a junction portion located at the rear, the guiding portion is configured to be at least partially open at the top and front and rear side, while closed at the bottom side, and the junction portion is configured to be closed at the up and bottom front side while open at the rear side; the length of the guiding portion is longer than the length of the first portion of the first mounting groove and is less than the total length of the first mounting groove, and the length of the junction portion is less than the length of the second portion of the first mounting groove.

As an embodiment of the present invention, the inside of the second mounting groove is provided with a projection 114 to cooperate with the hook of the second base to fix the second base and the first base.

As an embodiment of the present invention, the first base connecting portion further comprises an elastic element, and the elastic element is disposed between the first mounting groove and the second mounting groove, and the elastic element is used to cooperate with the second base and apply elastic force to it.

As an embodiment of the present invention, the upper surface of the first base is provided with a sinking portion, and the second base comprises a second base body and a second base, the second base is arranged at the bottom of the second base body, and the second base and the sinking portion is matched, wherein the hook is formed to extend downward from the lower surface of the second base, and the rear edge of the second base extends backward forming the extension portion, and the rotating shaft is arranged on the extension portion.

As an embodiment of the present invention, the first base body is further provided with a column, and the inside of the second base is provided with a column receiving cavity corresponding to the column; the column extends upward and rearward, and further has a curved shape, and the column receiving cavity has a rear side wall corresponding to the extending direction of the column and having a curved shape, when the first base and the second base are assembled, the column closely abuts the rear side wall.

As an embodiment of the present invention, the second base comprises a first housing and a second housing; the first housing is configured to be detachably connected with the second housing; at least a part of the first housing can be in cooperation with at least a part of the second housing to form the inner cavity.

As an embodiment of the present invention, the first base comprises a first base connecting portion, and the second base comprises a second base connecting portion; the first base connecting portion is configured to cooperate with the second base connecting portion to detachably connect the first base and the second base together; the second base connecting portion is configured on the second housing; the stationary device control assembly is configured to be fixedly connected with the second housing.

As an embodiment of the present invention, the stationary device control assembly comprises a charging circuit; the second base further comprises a charging terminal, and the charging terminal is configured to be at least partially received in the inner cavity, one end of the charging terminal is electrically connected to the charging circuit, and the other end of the charging terminal extends outside of the inner cavity; or the second base further comprises a wireless charging emitting module, the wireless charging emitting module is configured to be housed in the inner cavity, and the wireless charging emitting module is electrically connected to the charging circuit.

As an embodiment of the present invention, comprising a charging docking assembly, the charging docking assembly is configured to be integrally detachably connected to the stationary device; the charging docking assembly comprises a mounting base, a control board and a charging terminal; the mounting base comprises a control board mounting portion and a charging terminal portion; the control board is configured to be installed on the control board mounting portion; the charging terminal is configured to be installed in the charging terminal part; one end of the charging terminal is electrically connected to the control board, and the other end can be electrically connected to the mobile device.

Some example embodiments may therefore provide an autonomous working system, comprising a mobile device and a stationary device, wherein the mobile device is preferably a robotic lawn mower, robotic sweeper, robotic snow remover or robotic pool cleaner.

Some example embodiments may therefore provide a method for installing a stationary device comprising the following steps: pass the rotating shaft of the second base through the first mounting groove of the first base 1 and insert obliquely into the guiding portion of the third mounting groove of the first base; push the second base forward and downward to make the rotating shaft 212 of the second base abut against the rear end of the third mounting groove; press down the second base, to make the second base rotate counterclockwise around the axis of the rotating shaft, until the hook is inserted into the second mounting groove and down over the projection 114 to complete the assembly.

BRIEF DESCRIPTION OF THE DRAWING(S)

FIG. 10 is a side view of the first base of FIG. 3 in its first assembled state.

FIG. 11 is a sectional view of the first seat body of FIG. 10 dissected along line X2-X2.

FIG. 12 is a sectional view and partial enlargement of the first seat body of FIG. 11 dissected along line X3-X3.

FIG. 13 is a side view of the first base of FIG. 3 in its second assembled state.

DETAILED DESCRIPTION OF EMBODIMENT(S) OF THE INVENTION

The present invention will be described in detail below in connection with the specific embodiments shown in the accompanying drawings. However, these embodiments do not limit the present invention, and structural, methodological, or functional modifications made by a person of ordinary skill in the art in accordance with these embodiments are included within the scope of protection of the present invention.

It is to be understood that in the description of specific embodiments of the invention, the terms "first" and "second" are used for descriptive purposes only and are not to be understood as indicating or implying relative importance or implicitly specifying the number of technical features indicated. Thus, features qualified with "first" and "second" may explicitly or implicitly include one or more such features.

In specific embodiments of the invention, unless otherwise expressly specified and limited, the terms "connect" is to be understood in a broad sense, e.g. as a fixed connection, as a movable connection, as a detachable connection, or as an integral part; as a direct connection or as an indirect connection through an intermediate medium; as a connection within two elements or as an interaction between two elements. For those of ordinary skill in the art, the specific meaning of the above terms in the context of the present invention may be understood on a case-by-case basis. In specific embodiments of the invention, unless otherwise expressly specified and limited, the first feature "on" or "under" the second feature may include direct contact between the first and second features, or it may include contact between the first and second features not directly but through a separate feature between them. The first and second features may also be in direct contact with each other, or the first and second features may not be in direct contact with each other, but in contact with each other through a separate feature. In specific embodiments of the present invention, the article "a" or "an" means one, two or more, and is not limited to one, unless otherwise expressly specified and qualified.

For ease of description, in this document, the front, front end of the stationary device refers to the end at which the stationary device docks with the mobile device, and the rear, rear end refers to the end away from the stationary device that docks with the mobile device. The entry end refers to the end at which the mobile device enters the stationary device, and the termination end refers to the end at which the mobile device docks. However, it should be understood by those skilled in the art that such definitions are not absolute, and in other embodiments, the mobile device and the stationary device may also be docked in the middle of the mobile device, where the front end, front part refers to the part near the docking of the mobile device and the stationary device, and accordingly, the ends away from this part are called rear end, rear part.

Figure 1:
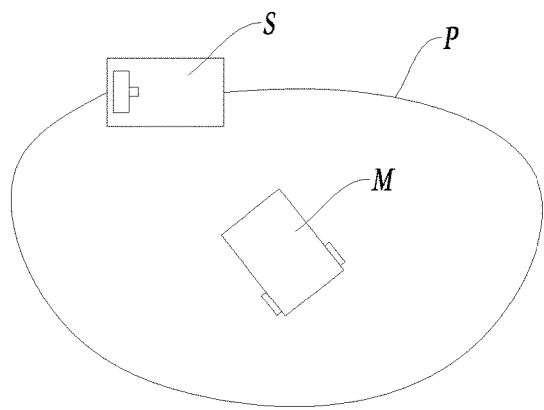
FIG. 1 is a schematic diagram of an autonomous working system of an embodiment of the present invention.

A typical embodiment of the present invention provides an autonomous work system, with reference to FIG. 1, including an apparatus to be charged and a power supply unit. It is taken as an example for illustration that the apparatus to be charged is configured as an autonomous working apparatus M, and the power supply unit is configured as a docking station S. Usually, the autonomous work system further includes a perimeter P. The autonomous working apparatus M is especially a robot that can autonomously move within a preset area defined by the perimeter P and perform specific operations, such as a robotic sweeper/vacuum cleaner that performs cleaning operations typically, or a robotic lawn mower that perform mowing operations, and so on, wherein the specific operation refers in particular to the treatment of the working surface which results in a change of the condition of the working surface. The present invention is described in detail by taking the robotic lawn mower as an example. The autonomous working apparatus M can autonomously walk on the surface of the working area, especially as the robotic lawn mower, can autonomously perform mowing operations on the lawn. The autonomous working apparatus at least includes a main body mechanism 1, a moving mechanism 2, a working mechanism, an energy source module, a detection module, an interactive module, a control module, and so on.

The main body mechanism 1 usually includes a chassis and a housing. The chassis is used for mounting and accommodating functional mechanisms and functional modules such as the moving mechanism 2, the working mechanism, the energy source module, the detection module, the interactive module and the control module. The housing is usually configured to at least partially cover the chassis, and mainly plays a role of enhancing the aesthetics and identification of the autonomous working apparatus. In this embodiment, the housing is configured to be able to translate and/or rotate resettably relative to the chassis by an external force, and cooperate with an appropriate detection module, such as a Hall sensor, to further serve to sense events such as collision, lift-up, etc.

The moving mechanism 2 is configured to support the main body mechanism 1 on the ground and drive the main body mechanism 1 to move, and usually includes a wheel type mechanism, a track type or half-track type mechanism, or a leg type mechanism, etc. In this embodiment, the moving mechanism 2 is a wheel type mechanism, which includes at least one driving wheel and at least one moving prime motor. The moving prime motor is preferably an electric motor, and in other embodiments, it can also be an internal combustion engine or a machine that uses other types of energy sources to generate power. In this embodiment, the moving mechanism 2 preferably includes a left driving wheel, a left driving prime motor for driving the left driving wheel, a right driving wheel and a right driving prime motor for driving the right driving wheel. In this embodiment, the rectilinear motion of the autonomous working apparatus is realized by the rotation of the left and right driving wheels at the same speed in the same direction, and the steering motion is realized by the rotation of the left and right driving wheels at different speeds in the same direction or opposite rotations. In other embodiments, the moving mechanism 2 can further include a steering mechanism independent of the driving wheel and a steering prime motor independent of the moving prime motor. In this embodiment, the moving mechanism 2 further includes at least one driven wheel, the driven wheel is typically configured as a caster, and the driving wheel and the driven wheel are respectively located at the front and rear ends of the autonomous working apparatus.

The working mechanism is configured to perform specific operations, and includes a working component 4 and a working prime motor for driving the working component 4. Exemplarily, for the robotic sweeper/vacuum cleaner, the working component includes a rolling brush, a dust absorption pipe, a dust collection chamber, and the like; for the robotic lawn mower, the working component 4 includes a cutting blade or a cutting head plate, and further includes other components for optimizing or regulating the mowing effect, such as a height adjustment mechanism for adjusting the mowing height. The working prime motor is preferably an electric motor, and in other embodiments, it can also be an internal combustion engine or a machine that uses other types of energy sources to generate power. In some other embodiments, the working prime motor and the walking prime motor are configured as the same prime motor.

The energy source module is configured to provide energy for various works of the autonomous working apparatus. In this embodiment, the energy source module includes a battery pack and a charging connection structure, wherein the battery pack is preferably a rechargeable battery pack and further preferably a lithium ion battery pack, and the charging connection structure is preferably a charging docking unit that can be exposed at the outside of the autonomous working apparatus. In other embodiments, the charging connection structure can be a wireless charging interface.

The detection module is configured as at least one sensor that senses environmental parameters of the autonomous working apparatus or its own working parameters. Typically, the detection module can include sensors related to the perimeter of the working area, such as magnetic induction, collision, ultrasonic, infrared, radio and other types. The sensor type is adapted to the position and number of corresponding signals generating devices that generate signals to define the limits of the working area. The detection module can further include sensors related to positioning and navigation, such as a GNSS device, a LIDAR device, an electronic compass, an acceleration sensor, an odometer, an angle sensor, and a geomagnetic sensor, etc. The detection module can further include sensors related to its own work safety, such as an obstacle sensor, a lifting sensor, and a battery pack temperature sensor, etc. The detection module can further include sensors related to the external environment, such as an environmental temperature sensor, an environmental humidity sensor, an illumination sensor, and a rain sensor, etc.

The interactive module is configured to at least receive control instruction information input by users, send information needed to be perceived by users, communicate with other systems or apparatus to send and receive information, and so on. In this embodiment, the interactive module includes an input device arranged on the autonomous working apparatus for receiving the control instruction information input by users, typically such as a control panel, and a stop button; and the interactive module further includes a display screen, an indicator light and/or a buzzer, which are arranged on the autonomous working apparatus for enabling the user to perceive information by emitting light or sound. In other embodiments, the interactive module includes a communication module arranged on the autonomous working apparatus and terminal apparatus independent of the autonomous working apparatus, such as a mobile phone, a computer and a network server, etc., and the control instruction information or other user control information can be input on the terminal apparatus and reach the autonomous working apparatus via a wired or wireless communication module.

The control module usually includes at least one processor and at least one non-volatile memory, a computer program or instruction set is pre-written in the memory, and the processor controls the execution of the autonomous working apparatus according to the computer program or the instruction set, such as moving, working and other actions. Further, the control module can also control and adjust corresponding behaviors of the autonomous working apparatus and modify the parameters in the memory according to the signal of the detection module and/or the user control instruction.

The perimeter is used for defining the working area of the autonomous work system, and usually includes an outer perimeter and an inner perimeter. The autonomous working apparatus is limited to move and work within the outer perimeter, beyond the inner perimeter, or between the outer perimeter and the inner perimeter. The perimeter can be physical, typically such as walls, fences and railings, etc. The perimeter can also be non-physical, typically such as an electromagnetic signal or an optical signal sent by a signal generator, or a virtual perimeter of an electronic map formed by two-dimensional or three-dimensional coordinates for the autonomous working apparatus provided with a positioning device (such as GNSS). In this embodiment, the perimeter is configured as a closed energization wire electrically connected with the perimeter signal generating device, and the perimeter signal generating device is usually arranged in the docking station.

The docking station is usually constructed on or within the perimeter for the docking and/or parking of the autonomous working apparatus. In particular, the docking station is provided with a power supply docking unit adapted to the charging docking unit, and when the charging docking unit is docked with the power supply docking unit, the docking station can supply energy to the autonomous working apparatus in the docking station. Usually, the docking station is connected with an external power supply via an external power supply interface, the external power supply can be connected to the national grid or provided as an independent large-capacity battery pack. The "docking" herein should be understood in a broad sense. In the case of contact charging, the docking refers to the formation of a stable electrical connection between the positive electrode of the charging docking unit and the positive electrode of the power supply docking unit, and the formation of a stable electrical connection between the negative electrode of the charging docking unit and the negative electrode of the power supply docking unit; in the case of non-contact charging, typically such as electromagnetic induction wireless charging, the docking refers to that the relative state between the charging docking unit (i.e., a power receiving coil) and the power supply docking unit (i.e., a power supply coil) meets the charging requirements (for example, the relative position relationship meets the charging requirements, and there is no object affecting the charging therebetween), and that stable charging can be realized.

Figure 2:
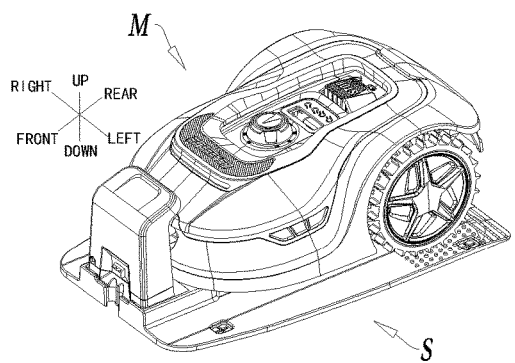
FIG. 2 is a stereoscopic schematic diagram of an autonomous working system of an embodiment of the present invention.

Referring now to FIG. 2, the present invention generally relates to an autonomous working system, comprising a mobile device M, and a stationary device S, exemplarily, the autonomous working system can be a robotic lawn mower system, such as a wire-embedded robotic lawn mower. At this time, the mobile device is a lawn mower robot and the stationary device is a stop station. After the moving device M finishes its work, it can be docked to the stationary device S by itself, for example, after mowing the lawn, the lawn mower robot can be docked to the stop, and the lawn mower robot can be charged in the stop station. The following is a detailed description of various embodiments of the stationary device S as the stop station of the robotic lawn mower system.

As a typical embodiment of the present invention, as shown in FIGS. 3 to 7, the stationary device S generally comprises a first base 1 mainly extended in a horizontal direction and a second base 2 mainly extended in a vertical direction. The first base 1 and the second base 2 are detachably connected by the seat connection structure. Wherein, the seat connection structure comprises a first base connecting portion 11 disposed on the first base 1 and a second base connecting portion 21 disposed on the second base 2. The first base 1 has a relative first base front end 101 and a first base rear end 102, and the first base connecting portion 11 is disposed adjacent the first base front end 101. The second base 2 comprises a second base body 20 and a second base bed 22, the second base body 20 having an inner cavity for receiving the charging mechanism and/or signal generating mechanism, the second base bed 22 disposed at the bottom of the second base body 20, and the second base connecting portion 21 disposed at the bottom of the second base bed 22.

Figure 3:
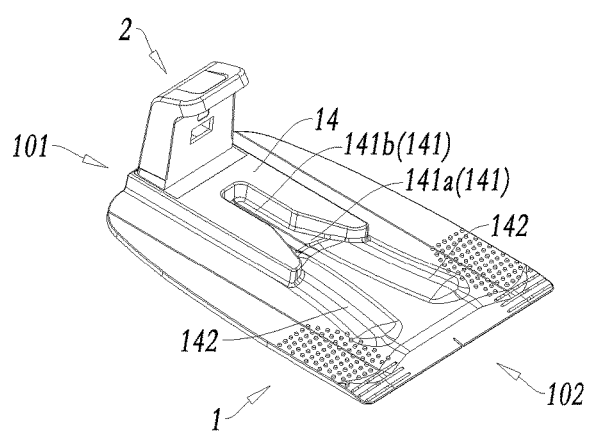
FIG. 3 is a stereoscopic view of a stationary device of an embodiment of the present invention.
Figure 4:
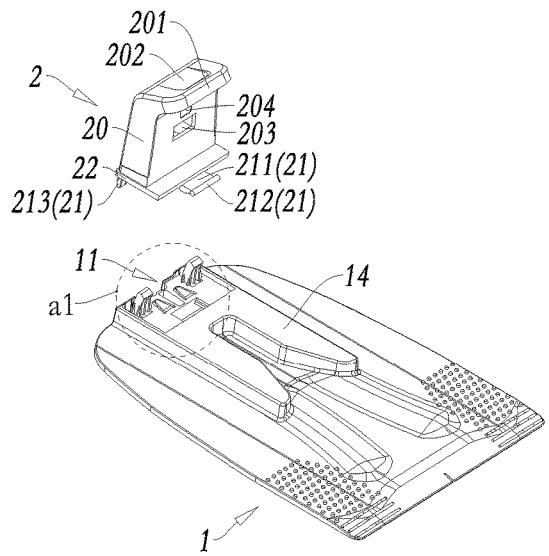
FIG. 4 and FIG. 5 are stereoscopic exploded views of a stationary device of FIG. 3 in different views respectively.
Figure 5:
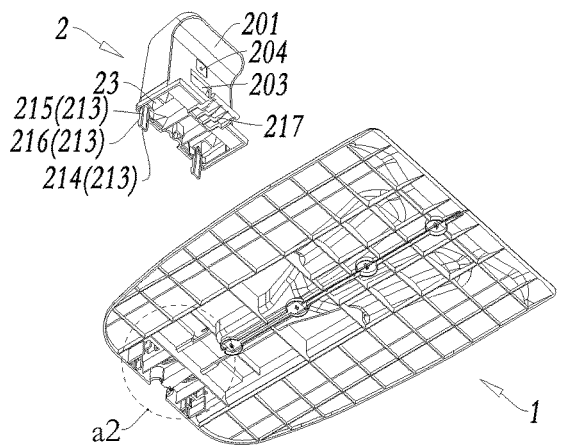

Referring to FIGS. 3 to 4, the first base 1 comprises a protrusion 14, and the protrusion 14 extends from the first base front end 101 of the first base 1 to the first base rear end 102 and generally extends approximately to the middle position of the first base 1 along the length direction. The details of the protrusion 14 will be further described below. The upper surface of the front end of the protrusion 14 is recessed to form a sinking portion 12, and the first base connecting portion 11 is mainly provided in the sinking portion 12.

Figure 6:
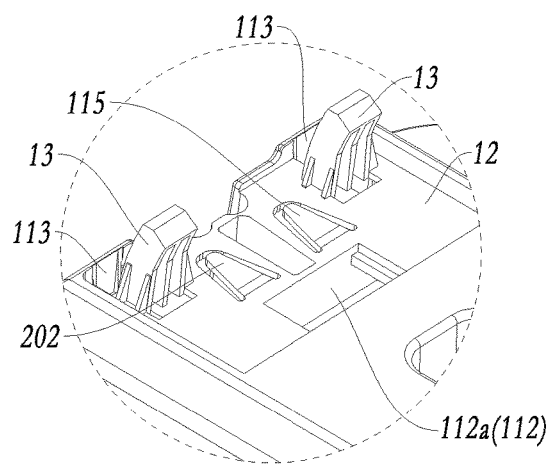
FIG. 6 is an enlarged view of part a1 in FIG. 4.
Figure 7:
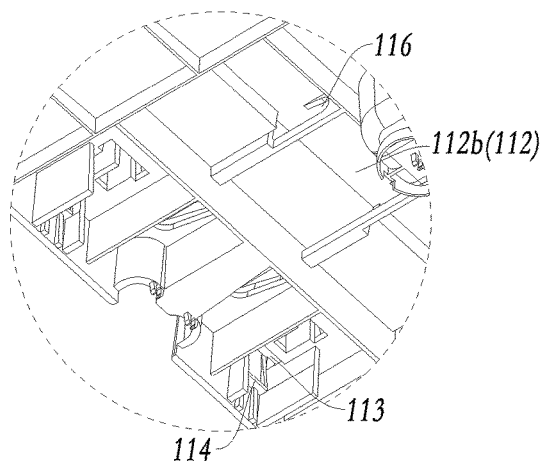
FIG. 7 is an enlarged view of part a2 in FIG. 5.

Specifically, as shown in FIGS. 6 to 7, the first base connecting portion 11 comprises a first mounting groove 112, a second mounting groove 113, an elastic element 115, and a third mounting groove 116. The first mounting groove 112 is disposed at the rear portion of the sinking portion 12, that is, close to the rear side wall of the sinking portion 12, and is configured to be recessed form the bottom surface of the sinking portion 12. The second mounting groove 113 is disposed at the front portion of the sinking portion 12, that is, close to the front side wall of the sinking portion 12, and is substantially arranged at both front sides of the first mounting groove 112, and the second mounting groove 113 is configured to extend from the upper surface to the lower surface of the first base body 1 and penetrate to the lower surface. The projection 114 is also provided inside of the second mounting groove 113, and the projection 114 is formed integrally extending laterally from the side wall of the second mounting groove 113. The two elastic elements 115 are disposed between the first mounting groove 112 and the second mounting groove 113 in the front-rear direction and are approximately symmetrical about the central axis of the first base 1 in the front-rear direction, the width between the two elastic elements 115 is narrower than the width between the two second mounting grooves 113, so that the two elastic elements 115 are located between the two second mounting grooves 113 in the left-right direction. The elastic element 115 is configured to provide an upward elastic force to cooperate with the bottom of the second base bed 22 of the second base 2 and apply an upward elastic force thereby. The third mounting groove 116 is provided at the bottom of the protrusion 14 and is located within the first mounting groove 112, which is arranged in a pair and is approximately symmetrical about the central axis of the first base 1 in the front-rear direction.

Figure 8:
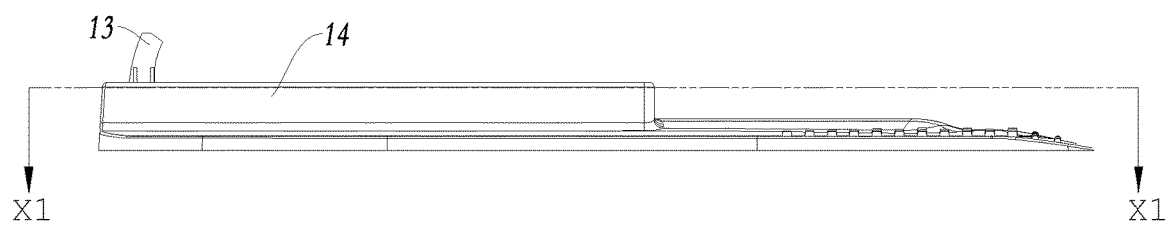
FIG. 8 is a side view of the first base of the stationary device of FIG. 3.
Figure 9:
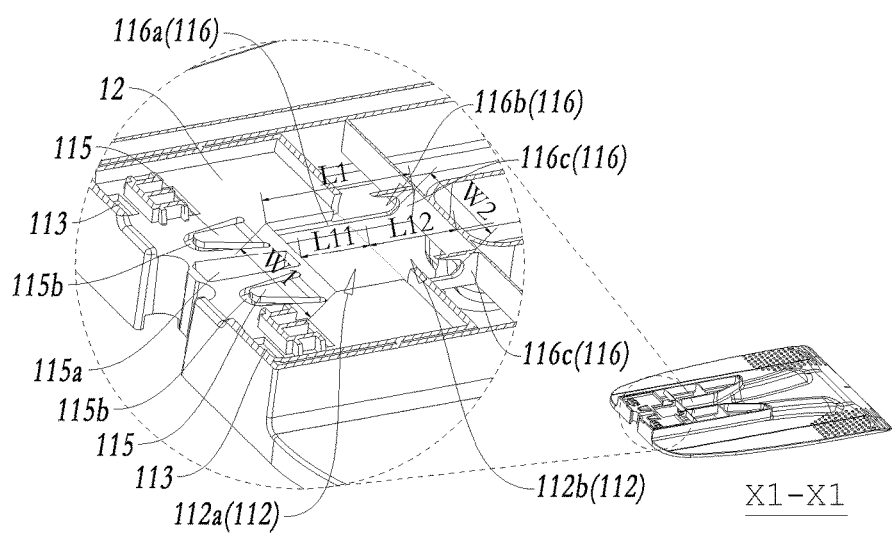
FIG. 9 is a cross-sectional view and partial enlargement of the first base in FIG. 8 dissected along line X1-X1.

The first mounting groove 112, the second mounting groove 113, the elastic element 115, and the third mounting groove 116 are described in detail below. As shown in FIG. 8 and FIG. 9, combined with FIG. 6 and FIG. 7, the first mounting groove 112 comprises a first portion 112a located at the front portion and a second portion 112b located at the rear, and the first portion 112a is located in the sinking portion 12 and is formed to penetrate the bottom of the sinking portion 12 as a through hole, that is, both above and below of the first portion 112a are open spaces. The second portion 112b extends backward from the rear end of the first portion 112a until the upper surface of the protrusion 14, that is, the upper part of the second portion 112b is blocked by the protrusion 14, and the second portion 112b is located below the upper surface of the protrusion 14, that is to say, the upper surface of the second portion 112b is closed by the upper surface of the first base 1, and the lower part is an open space.

Referring to FIG. 9, the first mounting groove 112 generally has a width W1 in the left-right direction and a length L1 in the front-rear direction, wherein the first portion 112a has a length L11 in the front-rear direction, and the second portion 112b has a length L12 in the front-rear direction. The total length L1 is equal to the sum of the length L11 of the first portion and the length L12 of the second portion, and the length L11 of the first portion is not particularly required, preferably set to approximately equal.

The central hole 115a is provided directly in the front of the first mounting groove 112, and the central hole 115a is roughly disposed on the central axis of the first base 1 along the front-rear direction, and extends in the sinking portion 12 along the front-rear direction of the first base 1. The size of the central hole 115a is set so that its length is greater than its width. A hole 115b of the elastic element is provided on both sides of the central hole 1115, and each of the elastic parts 115b is provided with an elastic element 115. Specifically, the elastic element 115 is formed integrally protruding from the rear portion of the hole 115b of the elastic element. The elastic element 115 has a shape that matches the hole 115b of the elastic element and has a size smaller than the hole 115b of the elastic element, therefor, the elastic element 115 can be elastically deformed and provide elastic force and enhance the buckling between the projection 114 and the hook 213 during assembly, and prevent disengagement due to the impact of a mobile device such as a lawn mower robot.

Referring back to FIGS. 5 and 6, a column 13 is provided on both sides of the elastic member 115, the column 13 is configured to extend upward from the bottom surface of the sinking portion 12, and the two columns 13 are preferably arranged symmetrically with respect to the elastic element 115. The second base body 20 comprises a column receiving cavity 23 corresponding to the column 13 in position and number. The column receiving cavity 23 has a lower opening. Preferably, the column 13 extends upward and rearward and further has a curved shape. The column receiving cavity 23 has a curved rear side wall 231 corresponding to the extending direction of the column 13 (refer to FIG. 19). When the first base 1 and the second base 2 are assembled, the column 13 fits the rear side wall 231.

Figure 19:
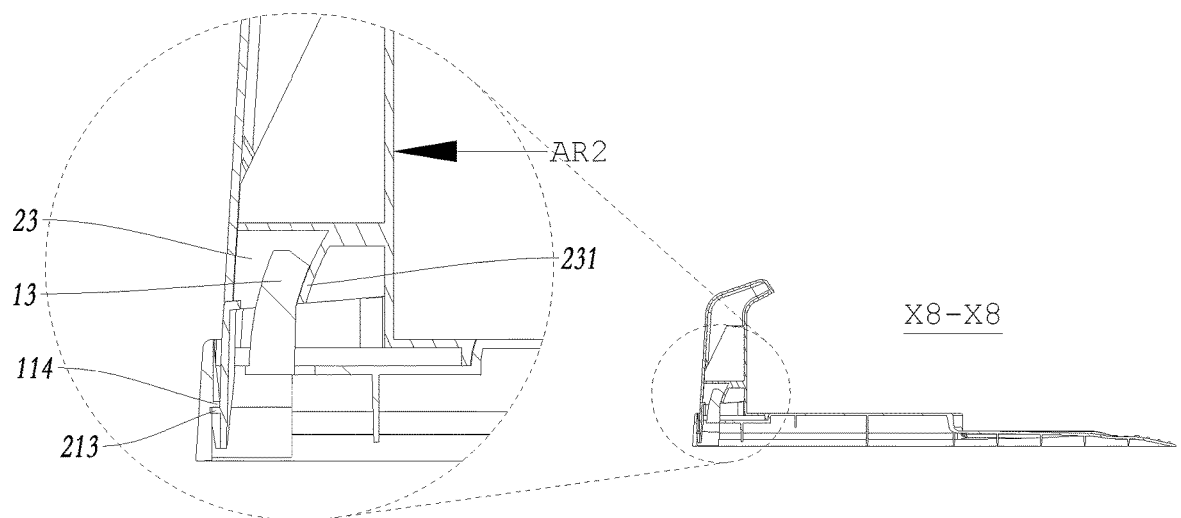
FIG. 19 is a sectional view and partial enlargement of the first base in FIG. 17 dissected along line X8-X8.

The above design allows while the mobile device M to hit the second base 2 of the stationary device S in the direction of the arrow AR2 in FIG. 19, the impact force is mainly transmitted to the column 13 through the rear side wall 231, with other buckle structures used to ensure the first base 1 and the second base 2 of the stationary device S remain relatively stable when impacted, in order to prevent the second base from shaking. In addition, the cooperation of the arc-shaped column 13 and the rear side wall 231 also forms a guide for assembling the stationary device S, which is convenient for assembling the second base 2 of the stationary device S to the first base 1.

Continuing to refer to FIG. 9, the second mounting groove 113 is provided at the front of the sinking portion 12 close to the front side wall of the sinking portion 12 and located in front of the column 13. Similar to the elastic element 115, the two second mounting grooves 113 are formed substantially symmetrically about the central axis of the first base 1 in the front-rear direction and are arranged outside the pair of elastic members 115 in the left-right direction, and adjacent to the both side walls of the sinking portion 12 on both sides. Referring back to FIG. 7, the inside of the second mounting groove 113 is provided with a projection 114 to cooperate with the hook 213 of the second base 2 to fix the second base 2 and the first base 1, which will be described in further detail below.

Continuing to refer to FIG. 9, the third mounting grooves 116 are arranged in pairs, and the pair of third mounting grooves 116 extend in the front-rear direction of the first base 1 and have an interval W2 in the left-right direction, and the interval W2 is smaller than the width W1 of the first mounting groove 112. Specifically, two baffles 116c extending in the front-rear direction are formed in the first mounting groove 112 substantially perpendicular to the bottom thereof. The distance between the two baffles 116c is the interval W2 between the pair of third mounting grooves 116, and the third mounting groove 116 is formed on the baffle 116c. Wherein, the third mounting groove 116 has a guiding portion 116a located at the front and a junction portion 116b located at the rear. The guiding portion 116a is configured to be at least partially open at the top and front and rear, while closed at the bottom. The length of the guiding portion 116a is longer than the length L11 of the first portion 112a of the first mounting groove 112 and is less than the total length L1 of the first mounting groove 112. The junction portion 116b is configured to be closed at the top, bottom, and front side, while open at the rear. The length L12 of the junction portion 116b is less than the length L12 of the second portion 112b of the first mounting groove 112. The guiding portion 116a extends in the horizontal direction and has a substantially linear guide rail structure, and the junction portion 116b has a curved shape structure to better cooperate with the rotating shaft 212 of the second base 2, which will be described in further detail below.

The second base 2 of an embodiment of the present invention will be described in detail below with reference to the accompanying drawings. Referring back to FIGS. 4 and 5, the second base 2 comprises a second base body 20 and a second base bed 22. The second base body 20 has an inner cavity for accommodating a charging mechanism and/or a signal generating mechanism, the second base bed 22 is provided at the bottom of the second base body 20, the bottom surface of the second base bed 22 is provided with the entrance of the column receiving cavity 23, the column 13 on the first base 1 is inserted into the column receiving cavity 23 from the entrance. The second base bed 22 has a plate-like structure, and the width in the front-rear direction is larger than the width of the second base body 20. The second base bed 22 has a shape that is set to correspond to match the sinking portion 12 on the first base 1.

The width of the second base body 20 slowly decreases from the lower end to the upper end, and is bent backward at the upper end to form a curved portion 201. The upper surface of the curved portion 201 is provided with a concave portion 202, which is located in the middle of the upper surface of the curved portion 201 and occupies approximately half of the area of the upper surface of the curved portion 201 in the left-right direction. The thickness of the curved portion 201 gradually decreases from the bottom end to the top end and forms a flat structure. The middle of the second base body 20 is provided with a charging hole 203 and an indicator hole 204. The charging hole 203 is used to install a charging device to charge the mobile device 1, and the indicator hole 204 is used to install an indicator light.

The second base connecting portion 21 is disposed at the bottom of the second base bed 22 and mainly comprises an extension portion 211, a rotating shaft 212 and a hook 213. The extension portion 211 is formed by extending a certain distance backward from the middle of the rear edge of the second base bed 22. The width of the extension portion 211 is smaller than the width of the second base bed 22. The rotating shaft 212 is arranged at the rear end of the extension portion 211 and extends along the left-right direction and exceeds the sides of the extending portion 211 at both ends. Wherein, the width of the rotating shaft 212 is smaller than the width W1 of the first mounting groove while larger than the width W2 of the third mounting groove. The extension portion 211 and the rotating shaft 212 are respectively corresponding to the first mounting groove 112 and the third mounting groove 116 on the first base 1. The hook 213 extends downward from the bottom of the second base bed 22 and corresponds to the second mounting groove 113 on the first base 1.

The bottom of the extension portion 211 is provided with a plurality of reinforcing ribs 217, the surface of the hook 213 away from the extension portion 211 is provided with a sliding groove 214, both sides of the sliding groove 214 form the sliding groove baffles 215, and the end of the sliding groove baffles 215 forms the hook body 216. When the second base 2 is installed on the first base 1, the hook 213 is matched with the second mounting groove 113 on the first base 1, and the hook body 216 is engaged to catch the projection 114 after the hook 213 moves downward for more than a certain distance, so that the first base 1 and the second base 2 are relatively fixed.

Figure 15:
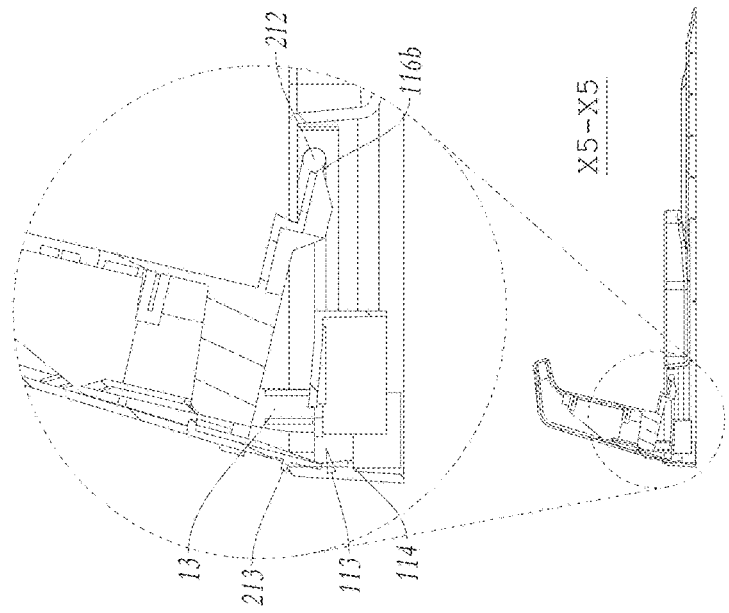
FIG. 15 is a sectional view and partial enlargement of the first base of FIG. 14 dissected along line X5-X5.
Figure 16:
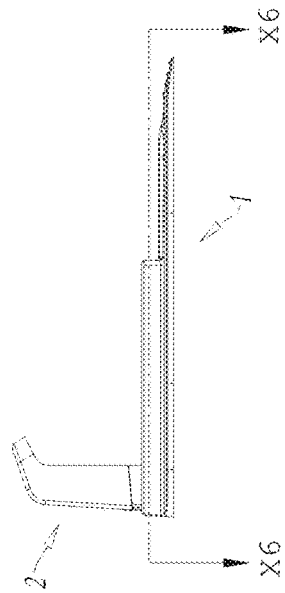
FIG. 16 is a side view of the first bae of FIG. 3 in the third assembled state.
Figure 14:
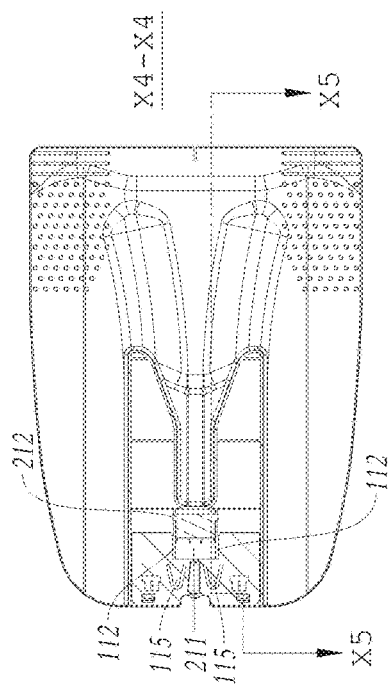
FIG. 14 is a sectional view of the first base of FIG. 13 dissected along line X4-X4.
Figure 17:
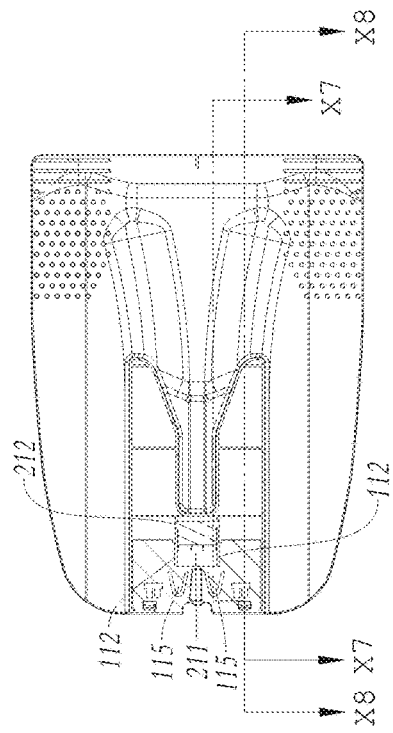
FIG. 17 is a sectional view of the first base of FIG. 16 dissected along line X6-X6.
Figure 18:
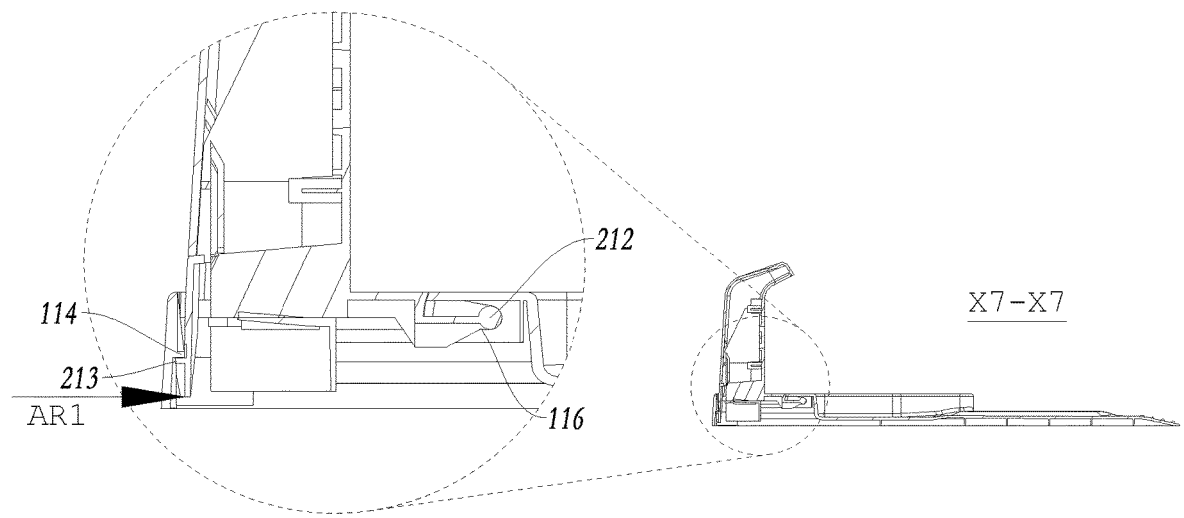
FIG. 18 is a sectional view and partial enlargement of the first base of FIG. 17 dissected along line X7-X7.

FIGS. 10 to 19 are diagrams of the process of assembling the first base 1 and the second base 2, wherein, the state shown in FIG. 10 to FIG. 12 is the first assembled state, and the state shown in FIG. 13 to FIG. 15 is the second assembled state, the state shown in FIG. 16 to FIG. 19 is the third assembled state, that is, the final assembled state. Hereinafter, the process of assembling the first base 1 and the second base 2 will be described with reference to FIGS. 10 to 19. As shown in FIGS. 10 to 12, when assembling the first base 1 and the second base 2, the rotating shaft 212 of the second base 2 enters the first mounting groove 112 of the first base 1 and is inserted obliquely into the guiding portion 116a of the third mounting groove 116. As shown in FIGS. 13-15, the second base 2 is pushed backward and downward to make the rotating shaft 212 abut against the rear end of the junction portion 116b. As shown in FIGS. 16-19, press down the second base 2 to make the second base 2 rotate counterclockwise around the axis of the rotating shaft 212, taking the direction shown in the figure as a reference, until the hook 213 is inserted into the second mounting groove 113 and down over the projection 114 to complete the assembly. When the assembly is completed, the second base 2 squeezes the elastic element 115, and the elastic element 115 gives the second base 2 a movement tendency to rotate clockwise. When it needs to be disassembled, just apply force to the hook 213 in the direction of arrow AR1 in FIG. 18 by hand to release the buckling of the hook 213 and the projection 114, and then rotate the second base 2 clockwise to complete the disassembly. In the above embodiment of the present invention, the horizontal extension part and the vertical extension part of the stationary device S are designed to be detachable connection, which is beneficial to reduce the packaging size, and the connection structure is optimized, so that the connection structure is more stable, and the installation and disassembly are more convenient.

In other embodiments, the pair of third mounting grooves 116 may be respectively located in two independent first mounting grooves 112, and the extension portion 211 and the rotating shaft 212 may be configured as an independent and symmetric pair. In other embodiments, the number of the first mounting groove 112, the second mounting groove 113 and the projection 114, the elastic element 115, the third mounting groove 116, the extension portion 211, the rotating shaft 212, and the hook 213 can be adjusted according to actual conditions.

Figure 20:
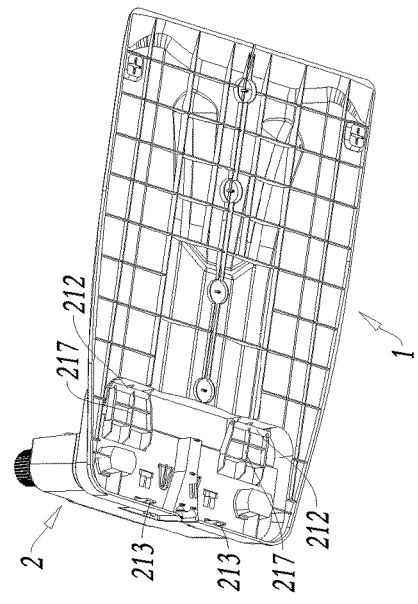
FIG. 20 is a schematic diagram of another embodiment of the present invention with the stationary device in a first state.
Figure 22:
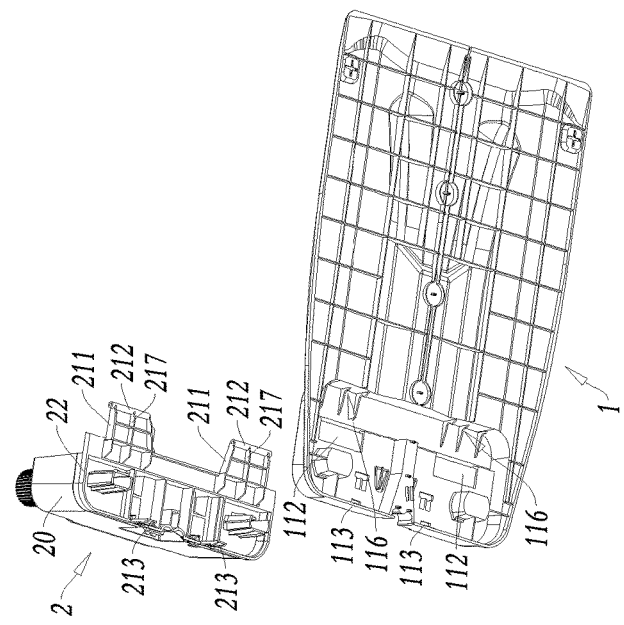
FIG. 22 is an elevation view of the stationary device of FIG. 20.
Figure 21:
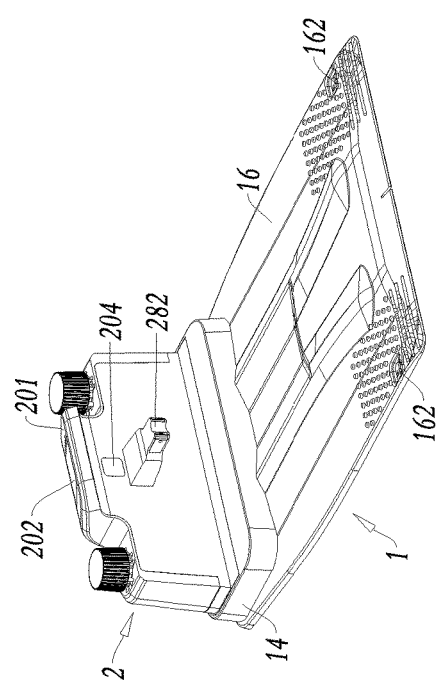
FIG. 21 is a schematic diagram of another embodiment of the present invention with the stationary device in a second state.
Figure 23:
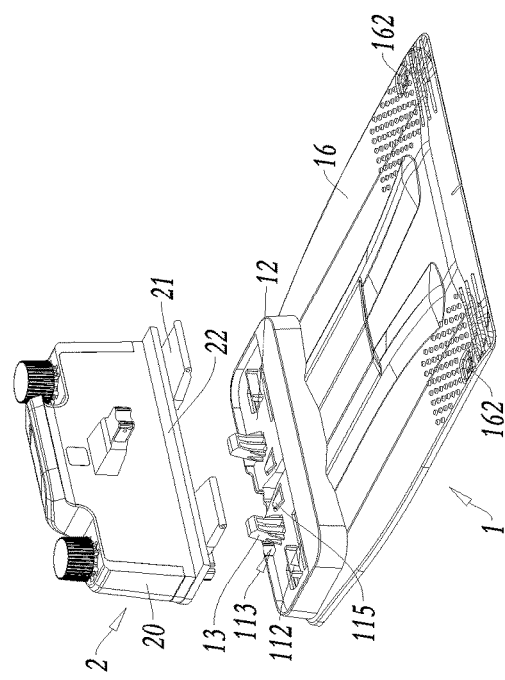
FIG. 23 is a stereoscopic exploded view of the stationary device of FIG. 20.

The stationary device S according to another embodiment of the present invention will be described below with reference to FIGS. 20-22. As shown in FIGS. 20-22, the overall structure of the stationary device of this embodiment is similar with the structure of the stationary device S of the previous embodiment. For parts that are not described or briefly described in this section, refer to the related description of the previous embodiment. This section focuses on the description of the different parts of the stationary device compared to the previous embodiment, and the same reference numerals are used for the parts that can be considered basically the same or equivalent. Those skilled in the art should understand that the features described in this section and the features described in the previous section can be interleaved, that is to say, the features described in this section can be combined with one or more features described in the previous section. The features of can also be combined with one or more features described in this section, as long as the parts that do not conflict with each other technically, they can be combined to the same one or more stationary devices.

The stationary device S of this embodiment also comprises a first base 1 mainly extending in the horizontal direction and a second base 2 mainly extending in the vertical direction overall. The first base 1 and the second base 2 are detachably connected by a seat connecting structure. The seat connecting structure comprises a first base connecting portion 11 provided on the first base 1 and a second base connecting portion 21 provided on the second base 2. The following focuses on the differences of the second base 2 of this embodiment compared to the foregoing embodiment in combination with FIGS. 20 to 23. In this embodiment, two extension portions 211 integrally protrude from the rear edge of the second base bed 22, and the two extension parts 211 are separated by a certain distance. The rotating shaft 212 is arranged at the bottom of the extension portion 211 and extends along the left and right directions. The extension portion 211 and the rotating shaft 212 respectively correspond to the first mounting groove 112 and the third mounting groove 116 on the first base 1. The hook 213 extends downward from the bottom of the second base bed 22 and corresponds to the second mounting groove 113 on the first base 1.

When assembling the first base 1 and the second base 2, the rotating shaft 212 of the second base 2 is inserted through the first mounting groove 112 of the first base 1 and inserted obliquely into the guiding portion of the third mounting groove 116. Then, push the second base 2 forward and downward so that the rotating shaft 212 abuts against the rear end of the junction portion 1116. Then the second base 2 is pressed down again, and the second base 2 rotates counterclockwise around the axis of the rotating shaft 212 until the hook 213 is inserted into the second mounting groove 113 and down over the projection to complete the assembly. When it is necessary to disassemble, only need to apply force to the hook 213 by hand to release the buckling of the hook 213 and the projection, and then rotate the second base 2 clockwise to complete the disassembly. In other embodiments, the number of the first mounting groove, the second mounting groove, the third mounting groove, the extension portion, the rotating shaft, the hook, etc. can be adjusted according to the actual conditions.

Figure 24:
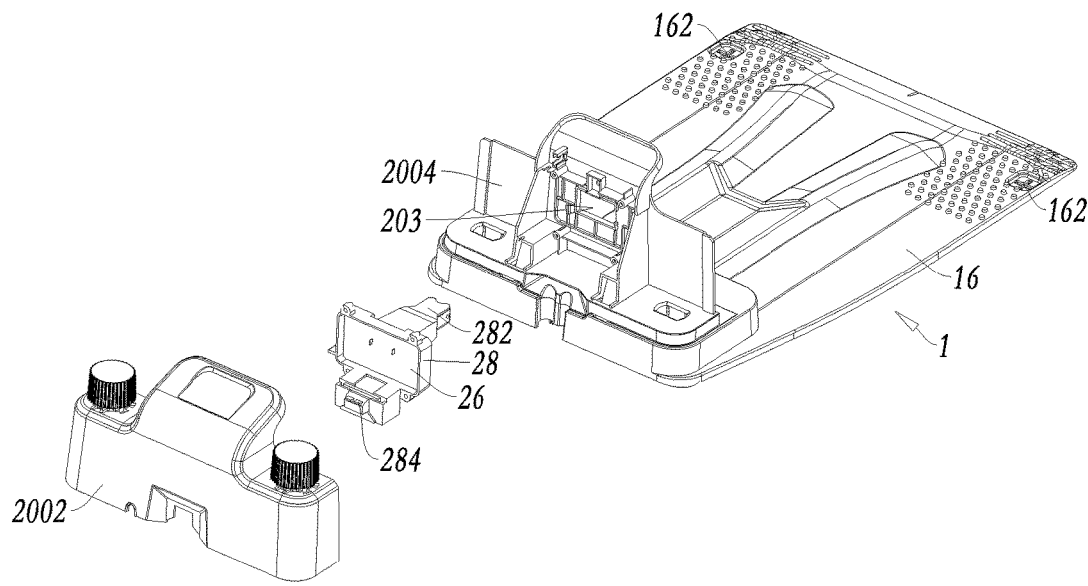
FIG. 24 is a schematic diagram of another embodiment of the present invention with the stationary device in a third state.

Another specific embodiment of the present invention provides a stationary device S, which comprises a first base 1, a second base 2 and a stationary device control assembly. Wherein, the first base 1 can be fixed on the working surface, the second base 2 and the first base 1 are detachably connected, and the stationary device control assembly is housed in the second base 2. Referring to FIG. 20, FIG. 21 and FIG. 24, the first base 1 comprises a bottom plate 16 and a first base connecting portion 11. The bottom plate 16 is provided with at least one fixed connection portion 162, the fixed connection portion 162 is configured to fix the first base 1 on the lawn, and preferably the first base 1 is anchored on the lawn. In the embodiment shown in the drawings, the fixed connection portion 162 is configured as a nail hole penetrating the upper and lower surfaces of the bottom plate 16, and a ground nail (not shown) can be inserted into the lawn after passing through the nail hole to insert the first base 1 on the lawn. The structure of the ground nail is well known to those skilled in the art, so it will not be repeated here. In other embodiments, the fixed connection portion 162 may be configured as a ground nail integrally formed with the first base body 12. The second structural member is exemplarily configured as a second base 2, and the second base 2 comprises a second base connecting portion 21. The first base connecting portion 11 and the second base connecting portion 21 are configured to cooperate with each other for detachably connecting the first base 1 and the second base 2. The specific structures of the first base connecting portion 11 and the second base connecting portion 21 have been fully disclosed in the foregoing embodiments. With the above structure, the user can easily remove the second base 2 from the first base 1. When the robotic lawn mower is not used for a long time, the robotic lawn mower and the second base 2 can be taken back indoor for storage, only the first base 1 that is not easily damaged and inexpensive is left on the lawn; when the robotic lawn mower is needed again, the user can easily install the second base 2 on the first base 1.

The second base 2 comprises an inner cavity, and the stationary device control assembly is accommodated in the inner cavity. Preferably, the stationary device control assembly is enclosed in the inner cavity, and the "enclosed in the inner cavity" means that only after the structure surrounding the inner cavity is destroyed or non-destructively disassembled, the stationary device control assembly can be taken out from the inner cavity. Further preferably, the "enclosed in the inner cavity" means that only after the structure enclosing the inner cavity is destroyed or non-destructively disassembled, the stationary device control assembly can be touched with a finger. With the above structure, after the user removes the second base 2 from the first base 1, the stationary device control assembly is still enclosed in the inner cavity, preventing the stationary device control assembly from accidental contact and causing damage.

In this embodiment, referring to FIG. 24, the second base 2 comprises a first housing 2002 and a second housing 2004, and the first housing 2002 and the second housing 2004 are detachably connected. In this embodiment, the first housing 2002 and the second housing 2004 are connected by a hook and a groove. In other embodiments, the first housing 2002 and the second housing 2004 may also be connected by screws.

In this embodiment, the second base connecting portion 21 is entirely constructed on the second housing 2004. In this way, when the stationary device control assembly needs to be repaired or replaced, only the first housing 2002 needs to be removed from the second housing 2004. In other embodiments, the second base connecting portion 21 may be fully constructed on the first housing 2002, or may be partially constructed on the first housing 2002 and partially constructed on the second housing 2004. In this embodiment, the stationary device control assembly is configured to be connected to the second housing 2004. In other embodiments, the stationary device control assembly can also be connected to the first housing 2002.

In this embodiment, the stationary device control component is configured as a control board 26, the control board 26 comprises a charging circuit for controlling the charging of the mobile device, and illustratively comprises detecting whether the mobile device is in a chargeable position, controlling the charging current, controlling the charging voltage, controlling the charging time, etc. The second base 2 further comprises a mounting base 28, the control board 26 is fixed to the mounting base 28, and the mounting base 28 is at least partially received in the inner cavity of the second base 2 and connected to the second base 2. In this embodiment, the stationary device S further comprises a charging terminal portion 282, and the charging terminal portion 282 is configured to comprise a charging terminal 2822. The charging terminal 2822 is configured as a metal contact piece, one end of which is electrically connected to the charging circuit, and the other end passes through the charging terminal 203 extending out of the inner cavity of the second base 2 for charging the battery of the mobile device with mating to the charging terminal of the mobile device. In other embodiments, the stationary device S comprises a wireless charging emitting module that is housed in the inner cavity of the second base 2 and is electrically connected to the control board 26.

In this embodiment, the mounting base 28 further comprises a boundary line interface 284, the control board 26 also comprises a signal generating circuit, and the boundary of the autonomous working system is composed of wires that form a closed loop. The boundary line interface 284 is electrically connected to the signal generating circuit. Two ends of the wire are detachably connected to the boundary line interface 284, respectively. With the above structure, when the second base 2 needs to be retracted, the two ends of the wire can be removed from the boundary line interface 284 first, and then the second base 2 is removed from the first base 1.

The stationary device S adopting the above-mentioned structure can optionally exhibit three states. In the first state, the first base 1 is fixed on the lawn, the second base 2 is connected to the first base 1, and the wire is connected to the boundary line interface 284. At this time, the mobile device can walk and cut grass in the enclosed working area of the wire. When the mobile device meets the preset conditions, for example, when the battery pack is insufficient, it can return to the stationary device S for charging. Specifically, the moving mechanism of the mobile device is carried on the bottom plate 16, the charging terminal of the mobile device is connected to the charging terminal of the stationary device S. In the second state, the first base 1 is fixed on the lawn, the second base 2 is separated from the first base 1, and the user can take the second base 2 back indoor for storage. In the third state, the first base 1 is fixed on the lawn, the second housing 2004 is connected to the first base 1, and the first housing 2002 is separated from the second housing 2004 and/or the first base 1, at this time the control board 26 is exposed for convenience of maintenance or replacement.

Another embodiment of the present invention provides a stationary device, wherein the second base 2 is provided with a charging docking assembly, the charging docking assembly comprises a charging terminal 2822, and the charging terminal 2822 cooperates with the power terminal of the mobile device to charge the mobile device. By integrating the electrical part of the fixture into one component, it is easy to assemble and maintain. As shown in FIG. 20, the charging docking assembly comprises a charging terminal portion 282. The charging terminal portion 282 may have various types of charging ports, such as a tongue-type charging port, a shrapnel-type charging port, a pin-type charging port, etc. The tongue-type charging port is taken as an example for description in this embodiment. In addition, those skilled in the art need to understand that, in other embodiments, the stationary device may only comprise the bottom plate 16, the charging docking assembly is disposed in the bottom plate 16, and the charging terminal portion 282 is disposed on the upper surface of the bottom plate.

Figures 25, 26:
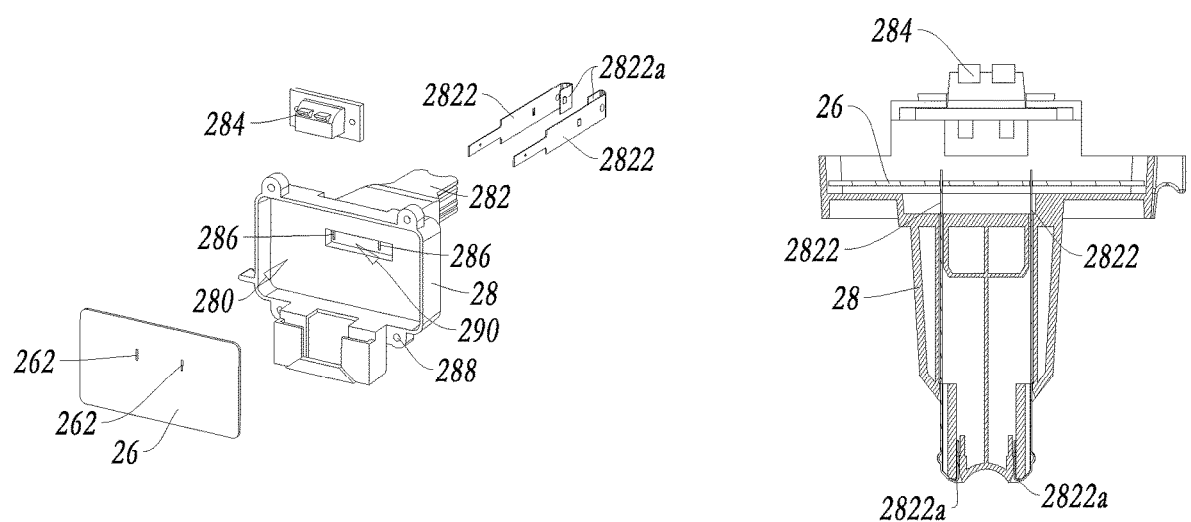
FIG. 25 is a stereoscopic exploded view of a charging docking assembly of an embodiment of the present invention.
FIG. 26 is a cross-sectional view of a charging docking assembly of an embodiment of the present invention.

Referring to FIGS. 24 to 26, the mounting base 28 has a substantially rectangular structure and has a relatively wide first surface and a second surface that are arranged oppositely. The first surface integrally protrudes forward to form a charging terminal portion 282. The second surface is recessed inward to form a control board accommodating cavity 280. The control board accommodating cavity 280 is configured to accommodate the control board 26 and is preferably potted with potting glue.

The bottom of the control board accommodating cavity 280 is formed with a groove 290 extending in the transverse direction. A charging contact slot 286 extending in a direction perpendicular to the groove 290 is formed in the groove 290. The charging contact slot 286 extends along the main part of the charging terminal portion 282 so that when the charging terminal 2822 is installed on the charging terminal portion 282, the end of the charging terminal 2822 can extend into the receiving cavity 312. Correspondingly, the control board 26 is provided with a jack 262 corresponding to the charging contact slot 286, and the end of the charging terminal 2822 extends into the jack 262, so that the end of the charging terminal 2822 can extend from one side of the control board 26 to the other side.

As shown in FIGS. 25 to 26, the charging docking assembly of this embodiment comprises a pair of charging terminals 2822, wherein one charging terminal 2822 is used as a positive contact, and the other charging terminal 2822 is used as a negative contact. Correspondingly, a pair of charging contact slots 286 is provided at the bottom of the control board accommodating cavity 280. The charging contact slots 286 extends a certain distance from the bottom of the bottom of the control board accommodating cavity (in the groove 290) along the extension direction of the charging terminal portion 282, that is to say, the contact slots 286 can have a certain depth along the extending direction of the charging terminal portion. The positive contact piece and the negative contact piece are installed at the charging terminal portion at intervals and connect to the control board 26 through the charging contact slots 286.

The four corners of the mounting base 28 can be provided with screw mounting portions 288 to install the mounting base 28 and further the entire charging docking assembly on the second housing 2004. The charging terminal 2822 comprises two charging contacts in total, and the front end of each charging terminal 2822 as shown in FIG. 25 has a bent portion 2822*a*. The width of the end of the charging terminal 2822 is reduced to match the socket 262 of the control board 26. The end of the charging terminal 2822 passes through the charging contact slot 286 and then is inserted into the socket 262 of the control board 26 to connect to the control board 26.

It should be noted that although the mounting seat is provided with a control board accommodating cavity in this embodiment, the control board is installed in the control board accommodating cavity. However, those skilled in the art should understand that the control board accommodating cavity is only one embodiment of the control board mounting portion, other forms of control board mounting portions may also be provided on the mounting seat, such as a control board mounting surface, a control board mounting groove, a control board mounting step, and the like. The following describes an assembly method of the charging docking assembly. When assembling the charging docking assembly, first insert the charging terminal 2822 from the bottom-up (the direction shown in the cross-sectional view of FIG. 26) into the charging contact slot 286 and fix it, wherein the charging terminal 282 and the charging contact slot 286 are provided with mutual matching fixing structure; then the control board 26 is assembled into the control board accommodating cavity 280, so that the end of the charging terminal 282 extends from one side of the control board 26 to the other side of the control board 26, and the charging terminal 282 is welded to the control board 26; Finally, the control board 26 is potted, and only the connectors (not shown in the figure) on the control board 26 are exposed to complete the assembly of the charging docking component. When the assembled charging docking component is installed on the second base 2, it is only necessary to fix the mounting base 28 to the second housing 2004 by means of, for example, a screw connection, and then buckle the first housing 2002 to the second housing 2004, the assembly of the charging device 100 is completed.

In summary, the electrical part of the charging device of the present invention is integrated on one component, which is convenient for assembly and maintenance. It should be noted that although the charging docking component is provided in the second base 2 in the above embodiments, in other embodiments, the charging docking component can also be provided in the bottom plate 16. At this time, the charging docking component can be parked on the bottom plate 16, such as the mobile device of the robotic lawn mower as the reference, move the device.

It should be understood that although this specification is described in terms of embodiments, not each embodiment contains only one separate technical solution, the specification is described in this way only for the sake of clarity and those skilled in the art should take the specification as a whole, and the technical solutions in each embodiment can be suitably combined to form other embodiments that can be understood by those skilled in the art.

The series of detailed descriptions set out above are only specific to a feasible embodiment of the invention and are not intended to limit the scope of protection of the invention; any equivalent embodiment or variation that does not depart from the spirit of the art of the invention shall be included within the scope of protection of the invention.

The invention claimed is:

1. A stationary device, comprising:
a first base;
a second base detachably connectable to the first base; and
a stationary device control assembly;
wherein the second base comprises a housing including an inner cavity;
wherein the stationary device control assembly is accommodated in the inner cavity and is enclosed by the housing;
wherein, in a first state, the first base is fixed on a working surface and the second base is connected to the first base; and
wherein, in a second state, the first base is fixed on the working surface and the second base is separated from the first base.

2. The stationary device according to claim 1, wherein:
the first base comprises a first base connecting portion,
the second base comprises a second base connecting portion, and
the first base connecting portion is configured to cooperate with the second base connecting portion to detachably connect the first base and the second base together.

3. The stationary device according to claim 2, wherein:
the first base connecting portion is provided with a rotating shaft, and the second base connecting portion is provided with a rotating shaft mating structure fitting with the rotating shaft, or the second base connecting portion is provided with a rotating shaft, and the first base connecting portion is provided with a rotating shaft mating structure fitting with the rotating shaft; and
the first base connecting portion and the second base connecting portion are provided with a buckle structure, the first base and the second base are connected via the rotating shaft and the rotating shaft mating structure and fixed by the buckle structure.

4. The stationary device according to claim 3, wherein the buckle structure comprises a hook arranged on the first base and a groove arranged on the second base cooperating with the hook, or the buckle structure comprises a hook arranged on the second base and a groove arranged on the first base cooperating with the hook.

5. The stationary device according to claim 2, wherein the first base connecting portion comprises a first mounting groove, a second mounting groove and a third mounting groove, the second base connecting portion comprises an extension portion, a hook and a rotating shaft, the hook is buckled to the second mounting groove, the extension portion is matched with the first mounting groove and the rotating shaft is rotatably connected to the third mounting groove.

6. The stationary device according to claim 5, wherein:
the first mounting groove extends along an upper surface of the first base, and the second mounting groove extends downward from the upper surface of the first base;
two baffles are formed in the first mounting groove, and each baffle is provided with the third mounting groove, an interval between the two baffles is smaller than a width of the first mounting groove;
the third mounting groove has a guiding portion located at a front and a junction portion located at a rear, wherein the guiding portion is configured to be at least partially open at top, front and rear sides while being closed at a bottom side, and the junction portion is configured to be closed at the top, bottom and front sides while being open at the rear side; and a length of the guiding portion is longer than a length of a first portion of the first mounting groove and is less than a total length of the first mounting groove, and a length of the junction portion is less than a length of a second portion of the first mounting groove.

7. A method for installing a stationary device according to claim 6, comprising:

passing the rotating shaft of the second base through the first mounting groove of the first base and insert obliquely into the guiding portion of the third mounting groove of the first base;

pushing the second base forward and downward to make the rotating shaft of the second base abut against the rear end of the third mounting groove; and pressing down the second base, to make the second base rotate around the axis of the rotating shaft, until the hook is inserted into the second mounting groove and down over a projection to complete the assembly, wherein the projection is provided inside the second mounting groove to cooperate with the hook of the second base to connect the second base and the first base.

8. The stationary device according to claim 5, wherein a projection is provided inside the second mounting groove to cooperate with the hook of the second base to connect the second base and the first base.

9. The stationary device according to claim 5, wherein the first base connecting portion further comprises an elastic element disposed between the first mounting groove and the second mounting groove, wherein the elastic element cooperates with the second base and applies an elastic force to the second base.

10. The stationary device according to claim 5, wherein an upper surface of the first base is provided with a sinking portion, and the second base comprises a second base body and a second base bed, wherein the second base bed is connected with a bottom of the second base body, and the second base bed and the sinking portion of the first base are matched, wherein the hook is formed to extend downward from a lower surface of the second base bed, a rear edge of the second base bed extends backward forming the extension portion, and the rotating shaft is arranged on the extension portion.

11. The stationary device according to claim 10, wherein:
the first base body is further provided with a column, and an inside of the second base is provided with a column receiving cavity corresponding to the column; and the column extends upward and rearward, and further has a curved shape, and the column receiving cavity has a rear side wall corresponding to an extending direction of the column and having a curved shape, and, when the first base and the second base are assembled, the column abuts the rear side wall.

12. The stationary device according to claim 1, wherein:
the housing of the second base comprises a first housing and a second housing;

the first housing is configured to be detachably connected with the second housing; and at least a part of the first housing cooperates with at least a part of the second housing to form the inner cavity.

13. The stationary device according to claim 12, wherein:
the first base comprises a first base connecting portion, and the second base comprises a second base connecting portion;

the first base connecting portion is configured to cooperate with the second base connecting portion to detachably connect the first base and the second base together;

the second base connecting portion is configured on the second housing; and the stationary device control assembly is configured to be connected with the second housing.

14. The stationary device according to claim 1, wherein:
the stationary device control assembly comprises a charging circuit;

the second base further comprises a charging terminal, and the charging terminal is configured to be at least partially received in the inner cavity, a first end of the charging terminal is electrically connected to the charging circuit, and a second end of the charging terminal extends outside of the inner cavity;

or the second base further comprises a wireless charging emitting module, the wireless charging emitting module is configured to be housed in the inner cavity, and the wireless charging emitting module is electrically connected to the charging circuit.

15. The stationary device according to claim 1, further comprising:

a charging docking assembly, wherein the charging docking assembly is configured to be integrally detachably connected to the stationary device;

wherein the charging docking assembly comprises a mounting base, a control board and a charging terminal;

wherein the mounting base comprises a control board mounting portion and a charging terminal portion;

wherein the control board is configured to be installed on the control board mounting portion;

wherein the charging terminal is configured to be installed in the charging terminal part; and wherein one end of the charging terminal is electrically connected to the control board, and the other end is electrically connectable to the mobile device.

16. An autonomous working system, comprising a mobile device and a stationary device according to claim 1, wherein the mobile device is at least one of a robotic lawn mower, a robotic sweeper, a robotic snow remover or a robotic pool cleaner.

17. The stationary device according to claim 1, wherein the housing prevents accidental contact between a user and the stationary device control assembly.

18. The stationary device according to claim 1, wherein access to the stationary device control assembly is discouraged by the housing until the housing is at least one of disassembled or destroyed.

* * * * *